(12) United States Patent
Raisch et al.

(10) Patent No.: US 10,352,401 B2
(45) Date of Patent: Jul. 16, 2019

(54) TRANSMISSION ARRANGEMENT

(71) Applicant: DEERE & COMPANY, Moline, IL (US)

(72) Inventors: Stefan Raisch, Vaihingen/Enz (DE); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 338 days.

(21) Appl. No.: 15/143,947

(22) Filed: May 2, 2016

(65) Prior Publication Data

US 2016/0327128 A1 Nov. 10, 2016

(30) Foreign Application Priority Data

May 4, 2015 (DE) .................. 10 2015 208 166

(51) Int. Cl.
*F16H 3/093* (2006.01)
*F16H 37/04* (2006.01)
(Continued)

(52) U.S. Cl.
CPC ........... *F16H 3/093* (2013.01); *F16H 37/043* (2013.01); *F16H 3/006* (2013.01); *F16H 2003/008* (2013.01); *F16H 2003/0803* (2013.01); *F16H 2003/0818* (2013.01); *F16H 2003/0826* (2013.01); *F16H 2037/045* (2013.01); *F16H 2200/0026* (2013.01); *F16H 2200/0078* (2013.01)

(58) Field of Classification Search
CPC ........ F16H 3/006; F16H 3/093; F16H 37/043; F16H 2003/008; F16H 2003/0803; F16H 2003/0818; F16H 2003/0826; F16H 2037/045; F16H 2200/0078; F16H 2200/0026
USPC .................................................. 74/329, 331
See application file for complete search history.

(56) References Cited

U.S. PATENT DOCUMENTS

| 3,802,293 | A | * | 4/1974 | Winckler | ................ F16H 3/097 74/331 |
| 2007/0266812 | A1 | * | 11/2007 | Asada | ..................... F16H 3/093 74/469 |

(Continued)

FOREIGN PATENT DOCUMENTS

| DE | 2156714 A1 | 5/1973 |
| DE | 10232838 A1 * | 2/2004 | ............. F16H 3/093 |

(Continued)

OTHER PUBLICATIONS

European Search Report in application 16168082.2, dated Sep. 19, 2016 (11 pages).

(Continued)

*Primary Examiner* — Victor L MacArthur
*Assistant Examiner* — Joseph Brown

(57) ABSTRACT

A transmission arrangement, particularly for an agricultural working vehicle, having a parallel-shift transmission with a plurality of gear stages and an input shaft, proceeding from which a drive power can be distributed via a first and a second shifting element to respective layshafts, and an output shaft, wherein the drive power can be transmitted by each of the layshafts to the output shaft as needed, and having a group-shift transmission with a plurality of shifting groups.

10 Claims, 6 Drawing Sheets

(51) Int. Cl.
*F16H 3/08* (2006.01)
*F16H 3/00* (2006.01)

(56) References Cited

U.S. PATENT DOCUMENTS

| | | | |
|---|---|---|---|
| 2013/0160587 A1* | 6/2013 | Ibamoto | F16H 3/006 74/331 |
| 2016/0069427 A1* | 3/2016 | Yang | F16H 3/006 74/661 |

FOREIGN PATENT DOCUMENTS

| | | | | |
|---|---|---|---|---|
| DE | 102005030987 A1 | 1/2007 | | |
| DE | 102010029597 A1 | 12/2011 | | |
| DE | 102012208126 A1 | 11/2013 | | |
| EP | 0797025 A1 | 9/1997 | | |
| EP | 1624232 A1 | 2/2006 | | |
| EP | 2243983 A2 | 10/2010 | | |
| JP | 10026189 A * | 1/1998 | | F16H 3/006 |
| JP | 2008180255 A | 8/2008 | | |
| WO | WO-2010103984 A1 * | 9/2010 | | F16H 3/006 |
| WO | WO-2013029640 A1 * | 3/2013 | | F16H 3/097 |
| WO | WO-2014171267 A1 * | 10/2014 | | F16H 3/006 |

OTHER PUBLICATIONS

European Search Report in application 16168086.3 dated Sep. 19, 2016 (10 pages).
German Search Report in foreign counterpart application No. 102015208164.8 dated Jun. 23, 2016 (7 pages).
German Search Report in foreign counterpart application No. 102015208166.4 dated Jun. 24, 2016 (7 pages).

* cited by examiner

| | A1 | A2 | | | B1 | B2 | | | B7 | B8 | 84 (B8″) | C1 | C2 |
|---|---|---|---|---|---|---|---|---|---|---|---|---|---|
| 1 | X | | | | X | | | | | | | X | |
| 3 | | | | | | | | | | | | | X |
| 2 | | X | | | | X | | | | | | | X |
| 4 | | | | | | | | | | | | | |
| 5 | | | | | | | | | | | | | |
| 7 | | | | | | | | | | X | | | |
| 6 | | | | | | | | | | | | | |
| 8 | | | | | | | | | | | X | | |
| C | X | X | | | | | | | | | | X | X |
| B | | | | | X | X | | | X | X | | | |
| 88₁ A | X | X | | | | | | | | | | | |
| 88₁ W | | | | | | | | | | | X | | |

FIG. 4

TRANSMISSION ARRANGEMENT

CROSS-REFERENCE TO RELATED APPLICATIONS

Pursuant to 35 USC § 119, this application claims the benefit of and priority to German patent application no. 102015208166.4, filed on May 4, 2015, which is herein incorporated by reference in its entirety.

FIELD OF THE DISCLOSURE

The disclosure relates to a transmission arrangement, particularly for an agricultural working vehicle, having a parallel-shift transmission with a plurality of gear stages and an input shaft, proceeding from which a drive power can be distributed via a first and a second shifting element to respective layshafts, and an output shaft, wherein the drive power can be transmitted by each of the layshafts to the output shaft as needed, and having a group-shift transmission with a plurality of shifting groups.

BACKGROUND

In agricultural working vehicles, such as tractors, the transmission arrangements must cover very different driving ranges due to the very wide range of use of the vehicle. This requires a correspondingly large spread between the slowest and the fastest transmission ratio stages of the transmission arrangements. "Slow" and "fast" in this context refer to the resulting travel speed of the vehicle. Transmission arrangements for agricultural working machines generally also have small geometric stage intervals between individual transmission stages, so that in combination with the large spread, a large number of gears is the result. In transmission arrangements for agricultural working machines, this large number of gear stages can be implemented with a reasonable effort by a group design.

One possible structure for a transmission arrangement for an agricultural working vehicle consists of a main manual transmission, a downstream group-shift transmission and a reversing transmission, also referred to as a reversing unit. Usually a main manual transmission with narrow stages is used, the gear stages of which are designed to be powershift-capable, and a group-shift transmission, the shifting groups of which are not powershift-capable, however. In such a transmission arrangement, a change of gears by the main manual transmission can be done by powershifting, i.e. without interruption of traction force, within a shifting group of the group-shift transmission. If it is necessary to change the shifting group of the group-shift transmission, however, this cannot be done without interrupting the traction force.

Such a transmission arrangement is presented by DE 10 2010 029597 A1, in which the main manual transmission is designed as a so-called parallel-shift transmission.

SUMMARY

In practice it is the case that in a group-shift transmission with three shifting groups A, B and C, for example, a powershift capability between shifting groups B and C would clearly and sufficiently increase driving comfort and simultaneously satisfy the requirement for no interruption of traction force when shifting in this travel speed range. In this case, shifting group A provides a slow transmission ratio stage and shifting group C a fast transmission ratio stage. At the same time it would be desirable to be able to provide a powershifting capability, at least to the extent just described, cost-effectively and without substantial modifications of existing transmission structures.

The problem addressed by the present disclosure is that of providing a transmission arrangement that partially or completely meets the above-mentioned requirements.

The problem is solved by a transmission arrangement, particularly for an agricultural working vehicle, comprising a parallel-shift transmission with a plurality of gear stages and an input shaft, proceeding from which a drive power can be distributed via a first and a second shifting element to respective layshafts, and an output shaft, wherein the drive power can be transmitted by each of the layshafts to the output shaft as needed, a group-shift transmission with a plurality of shifting groups and an output shaft, wherein the shifting groups can be drivingly connected to the output shaft of the parallel-shift transmission in order to direct the drive power to the output shaft of the group-shift transmission, and a coupling transmission stage, with which the drive power can be conducted, bypassing the shifting groups of the group-shift transmission, from one of the layshafts to the output shaft of the group-shift transmission.

Due to the design according to the disclosure, a powershift capability when shifting between groups of the group-shift transmission is achieved by virtue of the fact that the coupling transmission stage provides a bridge gear with which the shifting groups of the group-shift transmission can be bypassed in order to preselect, during that time, the shifting group to be engaged next. The next gear stage to be engaged is simultaneously preselected in the parallel-shift transmission. Proceeding from this, a powershift into the next transmission stage can take place, which results from the combination of the next shifting group to be engaged and the gear stage. This bridge gear can also be referred to as a replacement transmission stage since it provides exactly the transmission stage, from which the powershift into another shifting group is to be performed.

The coupling transmission stage is preferably constructed as a spur gear stage. A spur gear stage can be implemented with a simple design and is compact axially. In particular, the spur gear stage is constructed as a double spur gear stage with a spur gear rotatably mounted on a main shaft of the group-shift transmission.

Preferably a shifting point having a first and a second shifting position is provided, wherein one of the shifting groups is drivingly connected to the output shaft in the first shifting position, and the coupling transmission stage is drivingly connected to the output shaft in the second shifting position. A shifting point already present in the group shift gearbox can be used for this purpose.

The coupling transmission stage is preferably drivingly connected to the layshaft of the parallel shift gearbox that supports the even numbered gear stages. This guarantees that the other of the two layshafts, on which the uneven numbered gear stages are retained, cannot transfer any driving power while the coupling transmission stage is in the flow of force and a powershift between two shifting groups is to be performed.

The group-shift transmission preferably comprises a first, second and third shifting group wherein a transmission ratio of the coupling transmission stage corresponds to the transmission ratio that can be shifted by a combination of the gear stage of the parallel-shift transmission having the longest transmission ratio and the second shifting group of the group-shift transmission. The coupling transmission stage can function as a replacement for this combination of the gear stage having the longest transmission ratio and the second shifting group, so that the next shifting group or the next longest transmitting shift group can be preselected for a powershift via the layshaft not in the force flow path.

The coupling transmission stage is preferably arranged in the group-shift transmission. This can be easily realized structurally and in this way an existing shift point of the group-shift transmission can be used for shifting the coupling transmission stage.

BRIEF DESCRIPTION OF THE DRAWINGS

The transmission arrangement according to the disclosure will be described with reference to the following figures. Therein:

FIG. 4 shows a shifting matrix of the transmission arrangement in one possible embodiment;

DETAILED DESCRIPTION

Figure 1:
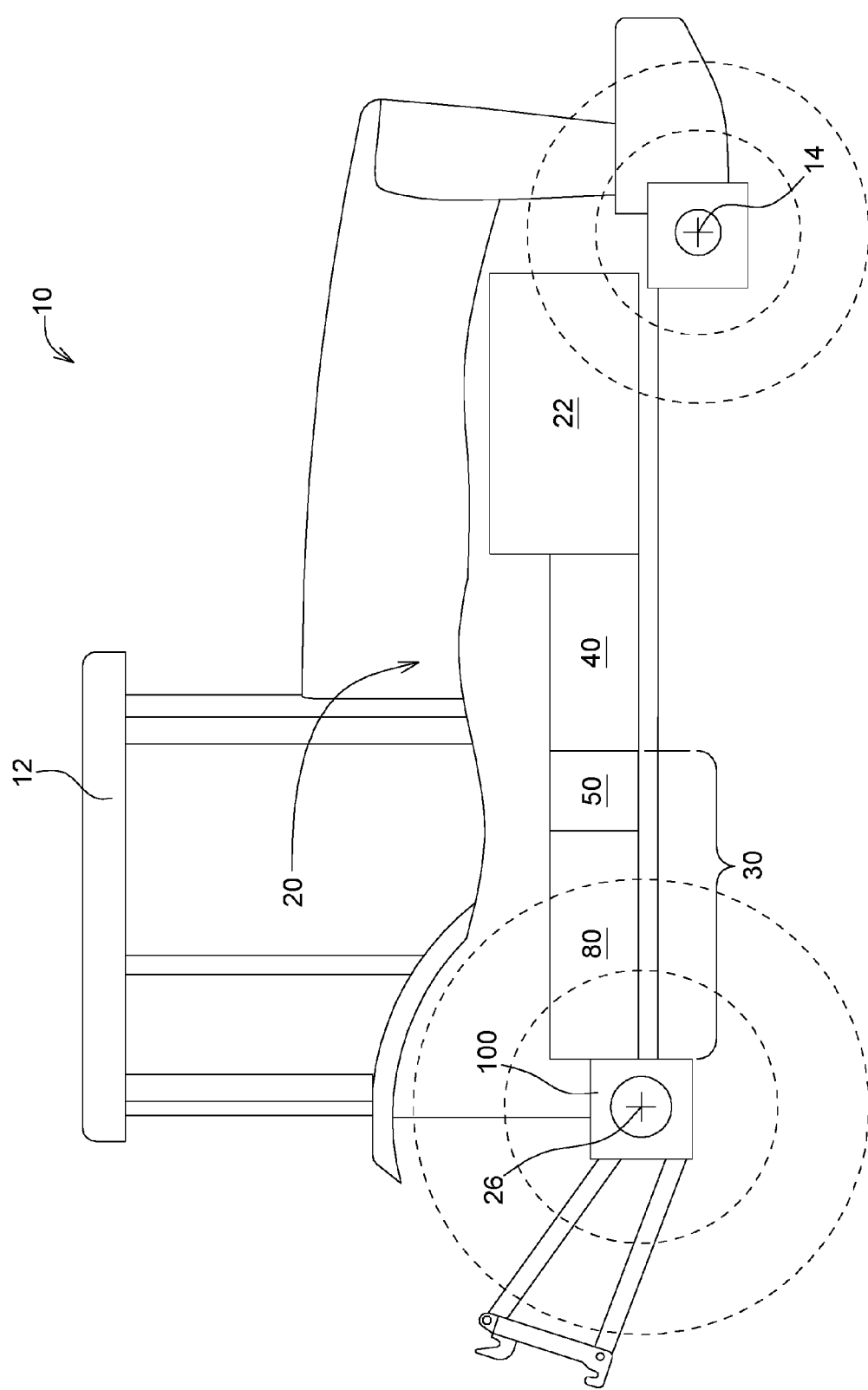
FIG. 1 shows an agricultural working vehicle having a drive train that comprises the transmission arrangement according to the disclosure.

FIG. 1 shows an agricultural working vehicle 10 in the form of a tractor having a drive train 20 in one possible embodiment. The working vehicle 10 further comprises a cab 12, a front vehicle axle 14 and a rear vehicle axle 26. The front vehicle axle 14 and the rear vehicle axle 26 are part of the drive train 20, wherein the rear vehicle axle 26 generally is driven continuously and the front vehicle axle 14 can generally be activated if needed.

The drive train 20 further comprises a drive engine 22, which can be constructed as an internal combustion engine, and a transmission structure, which can be composed of various individual transmission components as described below. In the transmission structure being currently described, a reversing transmission 40, a main manual shift transmission 50, a group-shift transmission 80 and a differential transmission 100 can be provided in the force and torque flow beginning from the drive engine 22. The unit consisting of the main manual shift transmission 50 and the group-shift transmission 80 is the transmission arrangement according to the disclosure, which is furnished with the reference number 30. The main manual shift transmission 50 is designed as a parallel-shift transmission. A representation of the output from the group-shift transmission 80 for the front wheel drive that can be activated if needed has been forgone.

Figure 2:
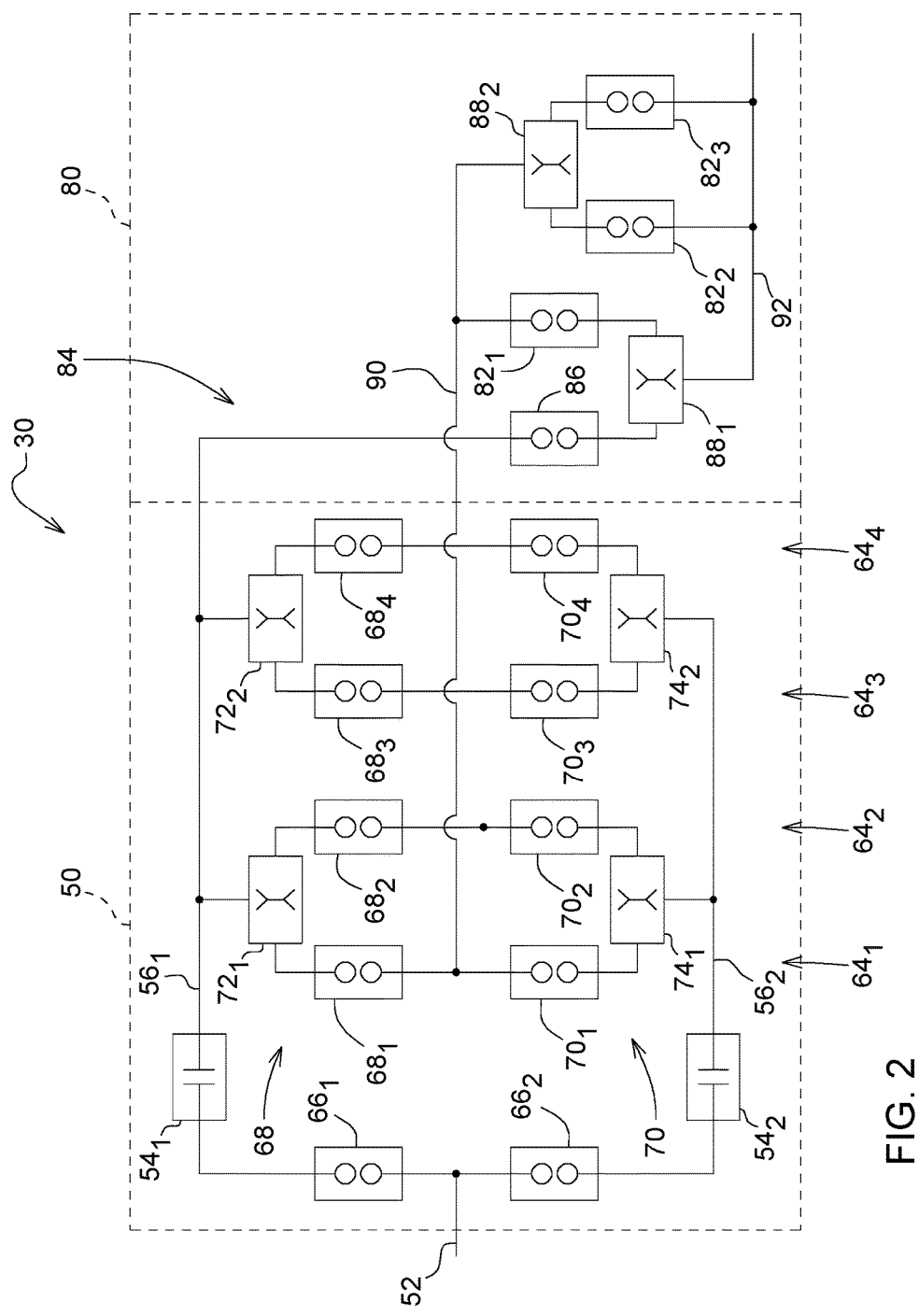
FIG. 2 shows a block shifting diagram of a transmission arrangement according to the disclosure in one possible embodiment.

FIG. 2 shows a block shifting diagram of a transmission arrangement 30 according to the disclosure in one possible embodiment. The transmission arrangement 30 comprises a main manual shift transmission in the form of a parallel-shift transmission 50 and a group-shift transmission 80 having three shifting groups $82_1$, $82_2$, $82_3$ in the present case. Both the parallel-shift transmission 50 and the group-shift transmission 80 can be constructed in a layshaft design, as shown in the present case.

The parallel-shift transmission 50 has an input shaft 52 driven by the drive engine 22 shown in FIG. 1, beginning from which the drive power can be distributed via two spur gear stages $66_1$, $66_2$ to respective shifting elements $54_1$, $54_2$, wherein the shifting elements $54_1$, $54_2$ can in turn bring layshafts $56_1$, $56_2$ into a driving connection to the spur gear stages $66_1$, $66_2$. Beginning from the layshafts $56_1$, $56_2$, the drive power can be transmitted via respective spur gear stages 68, 70 to an output of the parallel-shift transmission 50, wherein the output is formed by the output shaft 58. In one possible specific configuration, the spur gear stages $68_1$-$68_4$ are associated with the layshaft $56_1$ and the spur gear stages $70_1$-$70_4$ are associated with the layshaft $56_2$. Respective idler gears of the spur gear stages $68_1$-$70_4$ can be retained on the layshafts $56_1$, $56_2$ and can be brought into a driving connection to the respective layshaft $56_1$, $56_2$ by means of double shifting points $72_1$, $72_2$, $74_1$, $74_2$. Opposing spur gear stages on the layshafts $56_1$, $56_2$ are arranged in shift planes $64_1$-$64_4$. Thus the spur gear stages $68_1$, $70_1$ are arranged in the shift plane $64_1$, the spur gear stages $68_2$, $70_2$ are arranged in the shift plane $64_2$, the spur gear stages $68_3$, $70_3$ are arranged in the shift plane $64_3$ and the spur gear stages $68_4$, $70_4$ are arranged in the shift plane $64_4$.

The group-shift transmission 80 has a main shaft 90 driven by the output shaft 58 of the parallel-shift transmission 50, from which the drive power can be transmitted via three shifting groups $82_1$, $82_2$, $82_3$ constructed as spur gear stages to an output shaft 92. Respective idler gears of the shifting groups $82_2$, $82_3$ can be retained on the main shaft 90 and can be brought by means of the double shifting point $88_2$ into a driving connection to the main shaft 90. The idler gear of the shifting group $82_1$ is retained on the outputshaft 92 and can be brought into a driving connection to the output shaft 92 by means of the double shifting point $88_1$. As a result of the arrangement of the idler gear of the shifting group $82_1$ on the output shaft 92, the shifting point $88_1$ is also arranged on the output shaft 92, whereas the shifting point $88_2$ is arranged on the main shaft 90.

The embodiment of the transmission arrangement 30 shown in FIG. 2 further comprises a coupling transmission stage 84. The coupling transmission stage 84 is arranged in the group-shift transmission 80 in the present case. Alternatively, however, it can also be arranged in the parallel-shift transmission 50 or formed as an independent structural unit. The coupling transmission stage 84 is capable of establishing a driving connection between one of the layshafts $56_1$, $56_2$ and the output shaft 92 of the group-shift transmission 80. If this driving connection has been established, neither the other layshaft $56_2$, $56_1$ nor the main shaft 90 are in the force flow path. The coupling transmission stage 84 comprises a spur gear stage 86 and is associated with an idler gear 96 of the spur gear stage 86 of the output shaft 92, wherein the idler gear 96 can be drivingly connected to the output shaft 92 by means of the double shifting point $88_1$ in one of the shifting positions.

Figure 3:
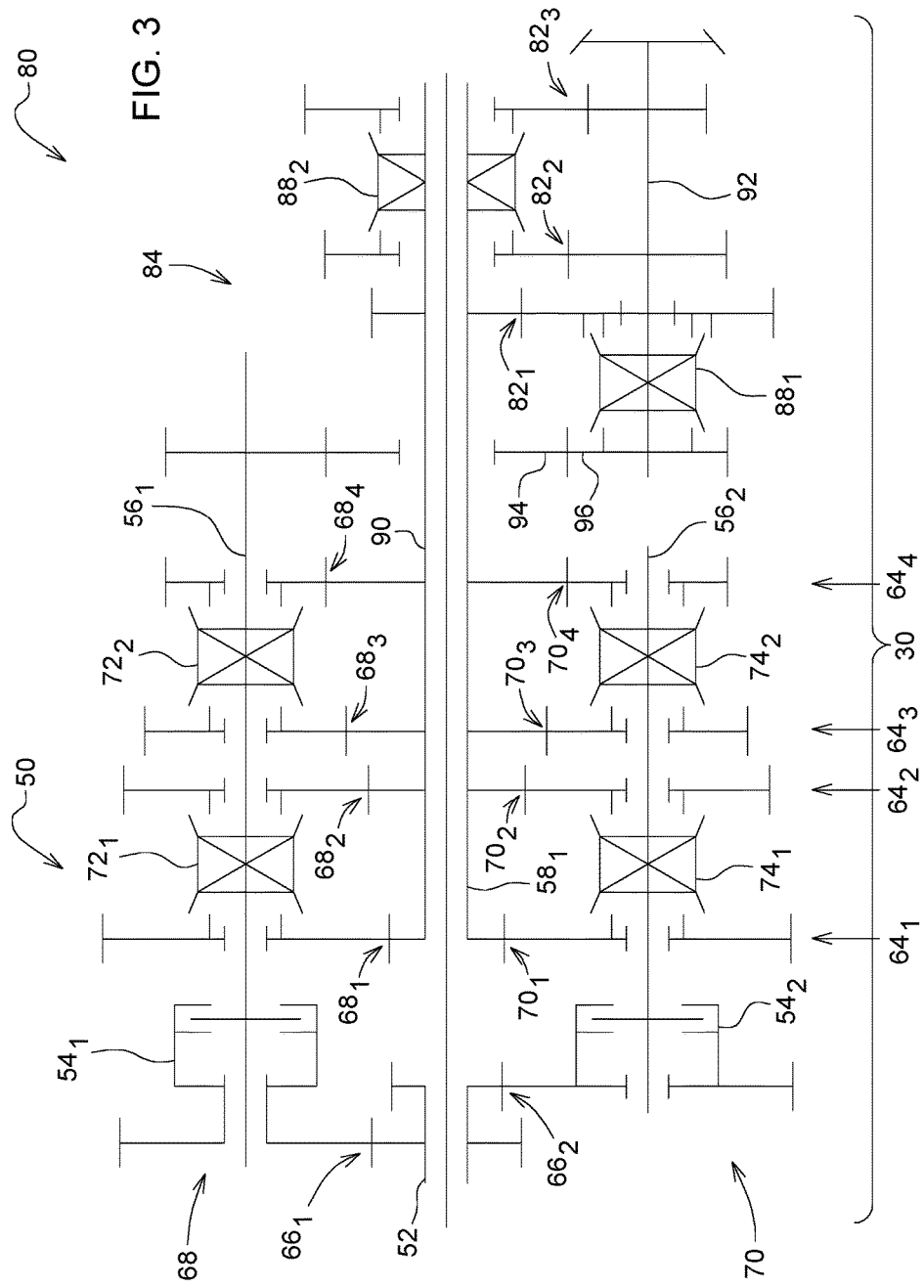
FIG. 3 shows a line diagram of the transmission arrangement in one possible embodiment.

FIG. 3 shows a line diagram of the transmission arrangement 30 in the embodiment previously described. The even-numbered gear stages 2, 4, 6 and 8 are retained on the layshaft $56_1$ of the parallel-shift transmission 50, wherein gear stage 8 is arranged in the first shifting plane $64_1$ and gear stage 2 in the fourth shifting plane $64_4$. The odd-numbered gear stages 1, 3, 5 and 7 are retained on the layshaft $56_2$, wherein gear stage 7 is arranged in the first shifting plane $64_1$ and gear stage 1 in the fourth shifting plane $64_4$. The shifting groups $82_1$, $82_2$, $82_3$ are arranged in such a manner that the shifting group $82_1$ is that with the shortest transmission ratio, and the shifting group $82_3$ is that with the longest transmission ratio. The shifting groups $82_1$, $82_2$, $82_3$ can also be referred to, in the same order, as A, B and C. The spur gear stage 86 is constructed as a double spur gear stage, in which a first idler gear 94 is retained on the output shaft 92 and a second idler gear 96 is retained on the main shaft 90. The first idler gear 94 can be connected via the shifting point $88_1$ to the output shaft 92.

FIG. 4 shows a shifting matrix of the embodiment of the gear arrangement 30 described by means of FIGS. 2 and 3. The shifting matrix merely reproduces the most important shifting states. First, the 8 gear stages of the parallel-shift transmission 50 are indicated in the columns of the shifting matrix. Then 3 shifting groups C, B, A of the group-shift transmission 80 are listed. Finally, the last column indicates the shifting state of the double shifting point $88_1$, in which the double shifting point $88_1$ drivingly connects the layshaft $56_1$ and the output shaft 92. As can be seen from the shifting matrix, the double-shifting point $88_1$ is initially in the shifting position in which the shifting group $82_1$, or A, is drivingly connected to the output shaft 91. While the shifting group $82_2$, or B, is being passed through, the shifting point $88_1$ is in a neutral position. Only for transitioning from shifting group $82_2$, or B, into the shifting group $82_C$, or C, is there a shift to the transmission ratio of the coupling transmission stage 84, labeled B8' in the present case, for bridging and in order to establish powershifting capability. For this purpose, the shifting point $88_1$ is brought into the shifting position in which the idler gear 96 of the spur gear stage 85 is drivingly connected to the output shaft 92.

Figure 5A:
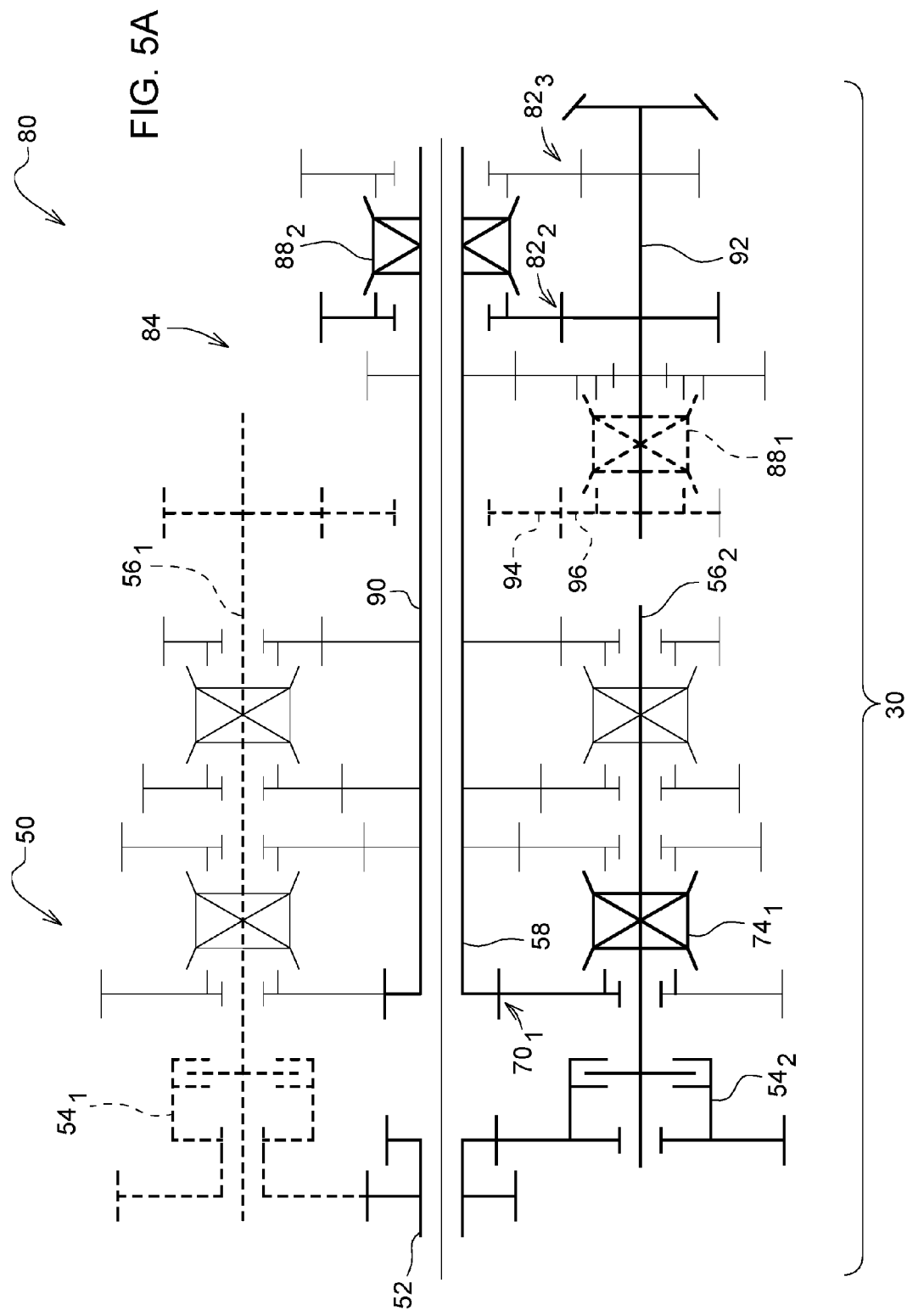
FIG. 5a shows a line diagram of the transmission arrangement in one possible embodiment with force flows before and after a powershift.
Figure 5B:
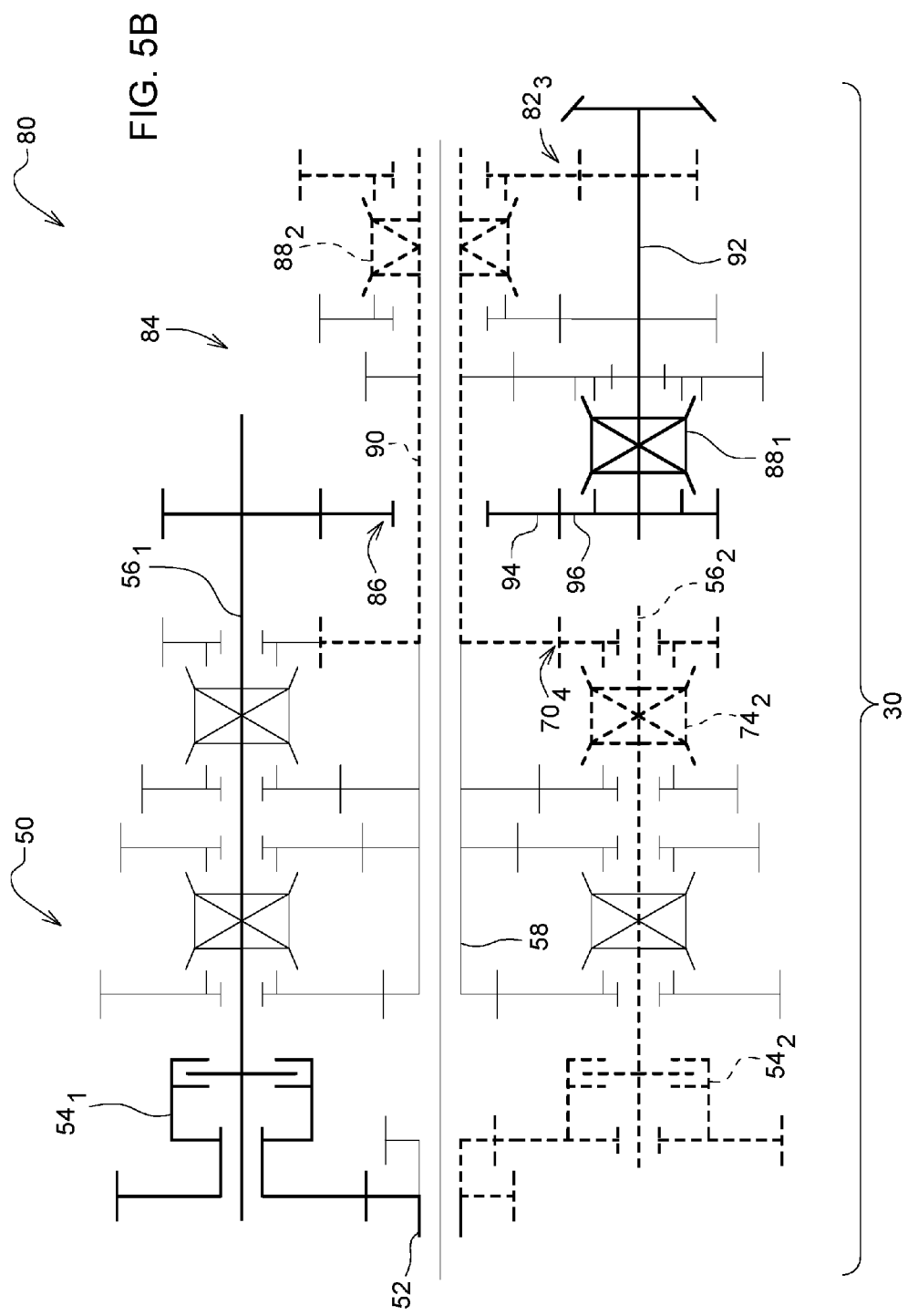
FIG. 5b shows a line diagram of the transmission arrangement in one possible embodiment with force flows before and after a powershift.

A sequence of powershifts from the transmission ratio B7 to the transmission ratio B8' of the coupling transmission stage 84, and from the latter to the transmission ratio C1, will be described below with reference to FIGS. 5a and 5b. The transmission arrangement 30 that is illustrated in FIGS. 5a and 5b corresponds to that which was explained in FIG. 4, to the extent that only the relevant reference numbers are drawn in FIGS. 5a and 5b. The first transmission ratio set is B7, the force flow of which is illustrated with a thick solid line in FIG. 5a. The force flow runs from the input shaft 52 via the shifting element $54_2$ to the layshaft $56_2$. Via the spur gear stage $70_1$, which corresponds to the gear stage 7 of the parallel-shift transmission 50, a driving force is applied via the appropriately positioned shifting point $74_1$ to the output shaft 58 and further to the group-shift transmission 80. There is in turn a flow of force via the shifting group $82_2$, or B, to the output shaft 92 via the appropriately positioned shifting point $88_2$. The transmission ratio B8', which has been preselected or is to be adjusted, of the coupling transmission stage 84 is also shown with a thick, dashed line in FIG. 5a. For this purpose, the shifting element $54_1$ is first disengaged. Via the double spur gear stage 86 of the coupling transmission stage 84 and the appropriately positioned shifting point $88_1$, the layshaft $56_1$ is drivingly connected to the output shaft 92 of the group shift transmission 80, so that a driving connection to the group-shift transmission 80 exists. The above-described line is thus coupled back, starting from the output shaft 92, to the disengaged shifting element $54_1$. Powershifting between the instantaneous transmission ratio B7 and the transmission ratio B8' of the coupling transmission stage 84 that is to be set is accomplished by actuating the two shifting elements $54_1$ and $54_2$ at the same time and in opposite directions, in particular by disengaging the shifting element $54_2$ and engaging the shifting element $54_1$.

The illustration in FIG. 5b is linked to the illustration in FIG. 5a, so that the initially adjusted transmission ratio B8' is shown in FIG. 5b with a thick solid line. The flow of force runs from the input shaft 52 via the shifting element $54_1$ to the layshaft $56_1$ and further via the double spur gear stage 86 of the coupling transmission stage 84 and the appropriately positioned shifting point $88_1$ to the output shaft 92 of the group-shift transmission 80. The transmission ratio C1, which has been preselected or is to be set, is also shown with a thick, dashed line in FIG. 5b. For this purpose, the shifting element $54_2$ is disengaged and, via the appropriately positioned shifting point $74_2$ and the spur gear stage $70_4$, which corresponds to the gear stage 1 of the parallel shift gear 50, the layshaft $56_2$ is drivingly connected to the output shaft 58, so that a driving connection to the group-shift transmission 80 exists. There is a flow of force via the shifting group $82_3$, or C, to the output shaft 92 via the appropriately positioned shifting point $88_2$. The above-described line is thus coupled back, starting from the output shaft 92, to the disengaged shifting element $54_2$. Powershifting between the instantaneous transmission ratio B8' of the coupling transmission stage 84 and the transmission ratio C1 that is to be set is accomplished by actuating the two shifting elements $54_1$ and $54_2$ at the same time and in opposite directions, in particular by disengaging the shifting element $54_1$ and engaging the shifting element $54_2$.

In summary it can be stated with respect to the transmission apparatus according to the disclosure, which was explained with reference to the described embodiment, that the coupling transmission stage is used as a support or substitute gear, in order to guarantee a powershifting capability between two shifting groups of the group-shift transmission. This is achieved in that one of the shifting groups of the group-shift transmission can be preselected and thus drivingly connected to the other of the layshafts while the flow of force starting from one of the layshafts of the parallel-shift transmission runs via the coupling transmission stage, and a power shifted change of transmission ratios can be accomplished via an opposite actuation of the shifting elements of the parallel-shift transmission.

LIST OF REFERENCE NUMBERS

10 Working vehicle
12 Cab
14 Front vehicle axle
20 Drive train
22 Drive engine
26 Rear vehicle axle
30 Transmission arrangement
40 Reversing gear
50 Parallel-shift transmission
52 Input shaft
54 Shifting element
56 Layshaft
58 Output shaft
60 Transmission ratio
62 Transmission ratio
64 Shifting plane
66 Spur gear stage
68 Spur gear stage
70 Spur gear stage
72 Shifting point
74 Shifting point
80 Group-shift transmission
82 Shifting groups
84 Coupling transmission stage
86 Spur gear stage
88 Double shifting position
90 Main shaft
92 Output shaft 94 Idler gear
96 Idler gear
100 Differential transmission

The invention claimed is:

1. A transmission arrangement for an agricultural working vehicle, comprising:
   a parallel-shift transmission having a plurality of gear stages and an input shaft, originating from which a drive power can be distributed via a first and a second shifting element to respective layshafts, and having a parallel-shift transmission output shaft, wherein the drive power can be transmitted from each of the layshafts to the parallel-shift transmission output shaft as needed;
   a group-shift transmission having a plurality of shifting groups associated with respective travel speeds and a group-shift output shaft, wherein the shifting groups can be drivingly connected to the parallel-shift transmission output shaft of the parallel-shift transmission in order to direct the drive power to the group-shift transmission output shaft of the group-shift transmission; and
   a coupling transmission stage, with which the drive power can be directed, bypassing the shifting groups of the group-shift transmission, from one of the layshafts to the group-shift transmission output shaft of the group-shift transmission;
   wherein the coupling transmission stage is constructed as a spur gear stage; and
   wherein the spur gear stage is constructed as a double spur gear stage having a spur gear rotatably mounted on a main shaft of the group-shift transmission coaxially connected with the parallel-shift transmission output shaft.

2. The transmission arrangement of claim 1, wherein a shifting point having a first and a second shifting position is provided, wherein one of the shifting groups is drivingly connected to the parallel-shift transmission output shaft in the first shifting position, and the coupling transmission stage is drivingly connected to the group-shift transmission output shaft in the second shifting position.

3. The transmission arrangement of claim 1, wherein the coupling transmission stage is drivingly connected to the layshaft bearing even-numbered gear stages of the parallel-shift transmission.

4. The transmission arrangement of claim 1, wherein the group-shift transmission comprises a first, a second and a third shifting group, and wherein a transmission ratio of the coupling transmission stage corresponds to a transmission ratio that can be shifted by a combination of the gear stage of the parallel-shift transmission having the longest transmission ratio and the second shifting group of the group-shift transmission.

5. The transmission arrangement of claim 1, wherein the coupling transmission stage is arranged in the group-shift transmission.

6. A transmission arrangement for a work vehicle, the transmission arrangement comprising:
   a parallel-shift transmission having a plurality of gear stages and a parallel-shift transmission input shaft, a drive power originating from the input shaft configured for distribution via a first shifting element and a second shifting element to a first layshaft and a second layshaft, respectively, and having a parallel-shift transmission output shaft, the drive power configured for selective transmission from each of the first layshaft and the second layshaft to the parallel-shift transmission output shaft;
   a group-shift transmission having a plurality of shifting groups associated with respective travel speeds and a group-shift output shaft, the plurality of shifting groups comprising a first shifting group corresponding to a first transmission ratio stage and a second shifting group corresponding to a second transmission ratio stage, the first transmission ratio stage corresponding to a first travel speed of the work vehicle, the second transmission ratio stage corresponding to a second travel speed of the work vehicle that is faster than the first travel speed of the work vehicle, the plurality of shifting groups configured for driving connection to the parallel-shift transmission output shaft of the parallel-shift transmission in order to direct the drive power to the group-shift transmission output shaft of the group-shift transmission; and
   a coupling transmission stage configured to direct drive power and configured for bypassing the plurality of shifting groups of the group-shift transmission, from one of the first layshaft and the second layshaft to the group-shift transmission output shaft of the group-shift transmission;
   wherein the coupling transmission stage is constructed as a spur gear stage; and
   wherein the spur gear stage is constructed as a double spur gear stage having a spur gear rotatably mounted on a main shaft of the group-shift transmission coaxially connected with the parallel-shift transmission output shaft.

7. The transmission arrangement of claim 6, further comprising:
   a first shifting position of a shifting point; and
   a second shifting position of the shifting point, wherein one of the plurality of shifting groups is drivingly connected to the parallel-shift transmission output shaft in the first shifting position, and the coupling transmission stage is drivingly connected to the group-shift transmission output shaft in the second shifting position.

8. The transmission arrangement of claim 6, wherein one of the first layshaft and the second layshaft bears even-numbered gear stages of the parallel-shift transmission, and the coupling transmission stage is drivingly connected to the one of the first layshaft and the second layshaft bearing even-numbered gear stages of the parallel-shift transmission.

9. The transmission arrangement of claim 6, wherein the group-shift transmission comprises a first shifting group, a second shifting group, and a third shifting group, and wherein a transmission ratio of the coupling transmission stage corresponds to a transmission ratio configured to be shifted by a combination of a gear stage of the parallel-shift transmission having a longest transmission ratio and the second shifting group of the group-shift transmission.

10. The transmission arrangement of claim 6, wherein the coupling transmission stage is arranged in the group-shift transmission.

* * * * *